(12) United States Patent
Mei et al.

(10) Patent No.: US 7,652,108 B2
(45) Date of Patent: Jan. 26, 2010

(54) PROCESS FOR THE GAS-PHASE POLYMERIZATION OLEFINS

(75) Inventors: Gabriele Mei, Ferrara (IT); Massimo Covezzi, Ferrara (IT); Stefano Bertolini, Ancona (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 11/665,210

(22) PCT Filed: Sep. 19, 2005

(86) PCT No.: PCT/EP2005/054645

§ 371 (c)(1),
(2), (4) Date: Feb. 8, 2008

(87) PCT Pub. No.: WO2006/040240

PCT Pub. Date: Apr. 20, 2006

(65) Prior Publication Data

US 2008/0312388 A1    Dec. 18, 2008

Related U.S. Application Data

(60) Provisional application No. 60/620,148, filed on Oct. 18, 2004.

(30) Foreign Application Priority Data

Oct. 14, 2004    (EP)    ................................ 04105058

(51) Int. Cl.
*C08F 2/34*    (2006.01)
*C08F 10/02*    (2006.01)

(52) U.S. Cl. .............................. 526/64; 526/65; 526/88; 526/904; 526/919

(58) Field of Classification Search .................... 526/64, 526/65, 904, 919, 88
See application file for complete search history.

(56) References Cited

U.S. PATENT DOCUMENTS 4,739,015 A    4/1988    Toyota et al.

(Continued)

FOREIGN PATENT DOCUMENTS

EP    232701    8/1987

(Continued)

OTHER PUBLICATIONS

J. Yerushalmi, "High Velocity Fluidized Beds," *Gas Fluidization Technology*, edited by D. Geldart, p. 155-196 (1986).

*Primary Examiner*—Fred M Teskin
(74) *Attorney, Agent, or Firm*—William R. Reid

(57) ABSTRACT

Process for the gas-phase polymerization of one or more alpha-olefins in the presence of a catalyst system, the process comprising:
    contacting in a continuous way one or more of said alpha-olefins with said catalyst system in a prepolymerization reactor, wherein the reaction is carried out in a liquid medium at a temperature ranging from 23° to 50° C.;
    feeding in continuous the prepolymer obtained in step a) into a gas-phase reactor having interconnected polymerization zones, where the growing polymer particles flow upward through a first polymerization zone (riser) under fast fluidization or transport conditions, leave said riser and enter a second polymerization zone (downcomer) through which they flow downward under the action of gravity, leave said downcomer and are reintroduced into said riser;
wherein the prepolymer obtained from step a) is continuously fed at a section of said riser characterized by an upwardly gas velocity higher than 3.0 m/s.

14 Claims, 1 Drawing Sheet

U.S. PATENT DOCUMENTS

| | | | |
|---|---|---|---|
| 4,803,251 A | 2/1989 | Goode et al. | |
| 5,610,244 A | 3/1997 | Govoni et al. | |
| 5,698,642 A | 12/1997 | Govoni et al. | |
| 6,228,956 B1 * | 5/2001 | Covezzi et al. | 526/65 |
| 6,413,477 B1 | 7/2002 | Govoni et al. | |
| 6,689,845 B1 | 2/2004 | Govoni et al. | |
| 6,818,187 B2 | 11/2004 | Govoni et al. | |
| 7,122,606 B2 * | 10/2006 | Tonti et al. | 526/64 |

FOREIGN PATENT DOCUMENTS

| | | |
|---|---|---|
| EP | 359444 | 3/1990 |
| EP | 728769 | 8/1996 |
| EP | 782587 | 7/1997 |
| EP | 887379 | 12/1998 |
| EP | 1012195 | 6/2000 |
| WO | 97/04015 | 2/1997 |
| WO | 99/58583 | 11/1999 |
| WO | 00/02929 | 1/2000 |
| WO | 00/66640 | 11/2000 |

* cited by examiner

PROCESS FOR THE GAS-PHASE POLYMERIZATION OLEFINS

This application is the U.S. national phase of International Application PCT/EP2005/054645, filed Sep. 19, 2005, claiming priority to European Patent Application 04105058.4 filed Oct. 14, 2004, and the benefit under 35 U.S.C. 119(e) of U.S. Provisional Application No. 60/620,148, filed Oct. 18, 2004; the disclosures of International Application PCT/EP2005/054645, European Patent Application 04105058.4 and U.S. Provisional Application No. 60/620,148, each as filed, are incorporated herein by reference.

The present invention relates to a continuous process for the gas-phase polymerization of α-olefins carried out in the presence of a polymerization catalyst system, the process being able to prepare polyolefins having a reduced amount of fine polymer particles.

In particular, the present invention relates to a gas-phase process wherein the polymerization catalyst system is first subjected to a prepolymerization step and the obtained prepolymer is successively fed to a gas-phase reactor having interconnected polymerization zones.

The development of olefin polymerization catalysts with high activity and selectivity, particularly of the Ziegler-Natta type and, more recently, of the metallocene type, has led to the widespread use on an industrial scale of processes in which the polymerization of olefins is carried out in a gaseous medium in the presence of a solid catalyst.

A widely used technology for gas-phase polymerization processes is the fluidized bed technology as well as the stirred bed technology. When the gas-phase polymerization of one or more olefins is carried out in a fluidized or mechanically stirred bed reactor, the polymer is obtained in the form of granules having a more or less regular morphology, depending on the morphology of the catalyst: the dimensions of the granules depend on the dimensions of the catalyst particles and on reaction conditions and are generally distributed around an average value.

In the conventional stirred or fluidized gas-phase reactors the heat of polymerization is removed by means of a heat exchanger placed inside the reactor or in the recycle line of the unreacted monomers. The reacting polymer bed consists of polymer particles with a defined geometrical shape and a granulometric distribution preferably narrow, generally distributed over values higher than 500 μm. However, a detrimental problem commonly to be faced in these polymerization processes is given by the presence of a significant amount of fine polymer particles. These fine particles are either derived from already existing fine catalyst particles or produced from the breakage of portions of the catalyst itself. Said fine particles tend to deposit onto and to electrostatically adhere to the pipes of the heat exchanger, as well as to deposit onto and electrostatically adhere to the inner walls of the polymerization reactor. Thereafter the fine particles grow in size by chemical reaction, thus causing an insulating effect and a lower heat transfer resulting in the formation of hot spots in the reactor.

These negative effects are even enhanced when the gas-phase olefin polymerization is carried out in the presence of highly active catalyst systems, such as those comprising the reaction product of an aluminum alkyl compound with a titanium compound supported on a magnesium halide in an active form.

As a consequence, a loss in the efficiency and homogeneity of the fluidization conditions of the polymer bed generally occurs. For example, the clogging of the polymer discharge system may occur. Moreover, the temperature excess caused by hot spots in the reactor can result in particles melting with the consequent formation of polymer lumps, which may clog the gas distribution plate placed at the bottom of the fluidized polymer bed. All these drawbacks lead to a poor process stability and can lead to a forced interruption of the polymerization run in order to remove the deposits which have formed inside the reactor or into the gas recycle line even after relatively short times.

Several solutions have been proposed to avoid these drawbacks, either by acting on the catalyst activity or, as an alternative, by reducing or eliminating the electrostatic voltage inside the polymer bed.

EP 359 444 and U.S. Pat. No. 4,739,015 describe the introduction into the polymerization reactor of small amounts of an inhibitor in order to reduce the olefin polymerization rate. Among the polymerization inhibitors, ethanol, methanol, ethylene glycol, propylene glycol and diethylene glycol are cited. These compounds must be used in an amount of few ppm with respect to the polymer in order not to deactivate the catalyst: at such low concentrations they are not effective as to a selective deactivation of the fine catalyst particles, whereas at higher concentrations the polymerization does not take place.

Alternative techniques have been proposed, aimed at reducing or eliminating the electrostatic voltage responsible for the phenomena of migration and formation of polymer deposits on the reactor walls. For instance, in U.S. Pat. No. 4,803,251 a group of chemical additives is described generating both positive and negative charges in the polymer bed. These additives are fed to the reactor in an amount of few ppm per part of monomer in order to prevent the formation of undesired positive or negative charges. The use of antistatic agents is also taught by EP 232 701 in a process for the preparation of ultra high molecular weight polyethylene (UHMWPE). The claimed antistatic agents prevent the formation of crusts inside the reactor, but the ethylene polymers have a rather low bulk density and the films obtained therefrom show impurities in the form of unmelted products.

Other processes for reducing the electrostatic voltage include: (1) installation of grounding devices in the fluidized bed; (2) ionization of gas or particles by electrical discharge to generate ions, which neutralize electrostatic charges onto the particles; (3) the use of radioactive sources to produce radiation capable of generating ions which neutralize electrostatic charges onto the particles. However, the application of these techniques on industrial scale in a fluidized bed polymerization reactor is generally neither practical nor easy.

A novel gas-phase polymerization process, which represents a gas-phase technology alternative to the fluidized bed reactor technology, as to the preparation of olefin polymers, is disclosed in the Applicant's earlier EP-B-1012195. The described polymerization process is carried out in a gas-phase reactor having interconnected polymerization zones, where the growing polymer particles flow through a first polymerization zone (riser) under fast fluidization or transport conditions, leave said riser and enter a second polymerization zone (downcomer) through which they flow in a densified form under the action of gravity, leave said downcomer and are reintroduced into the riser, thus establishing a circulation of polymer between the two polymerization zones.

It is now felt the need of minimizing the total amounts of fine polymer particles produced in said reactor, thus improving the particle size distribution of the polyolefins prepared by means of the above gas-phase technology.

The Applicant has surprising found that the prepolymerization of the catalyst system, as well as the modality of feeding the prepolymer to the polymerization zones of said gas-phase reactor can have a remarkable influence on the final particle size distribution of the obtained polyolefin powders. In particular, the Applicant has unexpectedly found that carrying out the prepolymerization step according to suitable operating conditions and feeding the prepolymer in a particular manner allows minimizing the formation of fine polymer particles inside the gas-phase polymerization reactor.

It is therefore an object of the present invention providing a process for the gas-phase polymerization of one or more alpha-olefins in the presence of a catalyst system, the process comprising:

a) contacting in a continuous way one or more of said alpha-olefins with said catalyst system in a prepolymerization reactor, wherein the reaction is carried out in a liquid medium at a temperature ranging from 23° to 50° C.;

b) feeding in continuous the prepolymer obtained from step a) into a gas-phase reactor having interconnected polymerization zones, where the growing polymer particles flow upward through a first polymerization zone (riser) under fast fluidization or transport conditions, leave said riser and enter a second polymerization zone (downcomer) through which they flow downward under the action of gravity, leave said downcomer and are reintroduced into the riser, thus establishing a circulation of polymer between the riser and the downcomer, wherein the prepolymer obtained from step a) is continuously fed at a section of said riser characterized by an upwardly gas velocity higher than 3.0 m/s.

Figure 1:
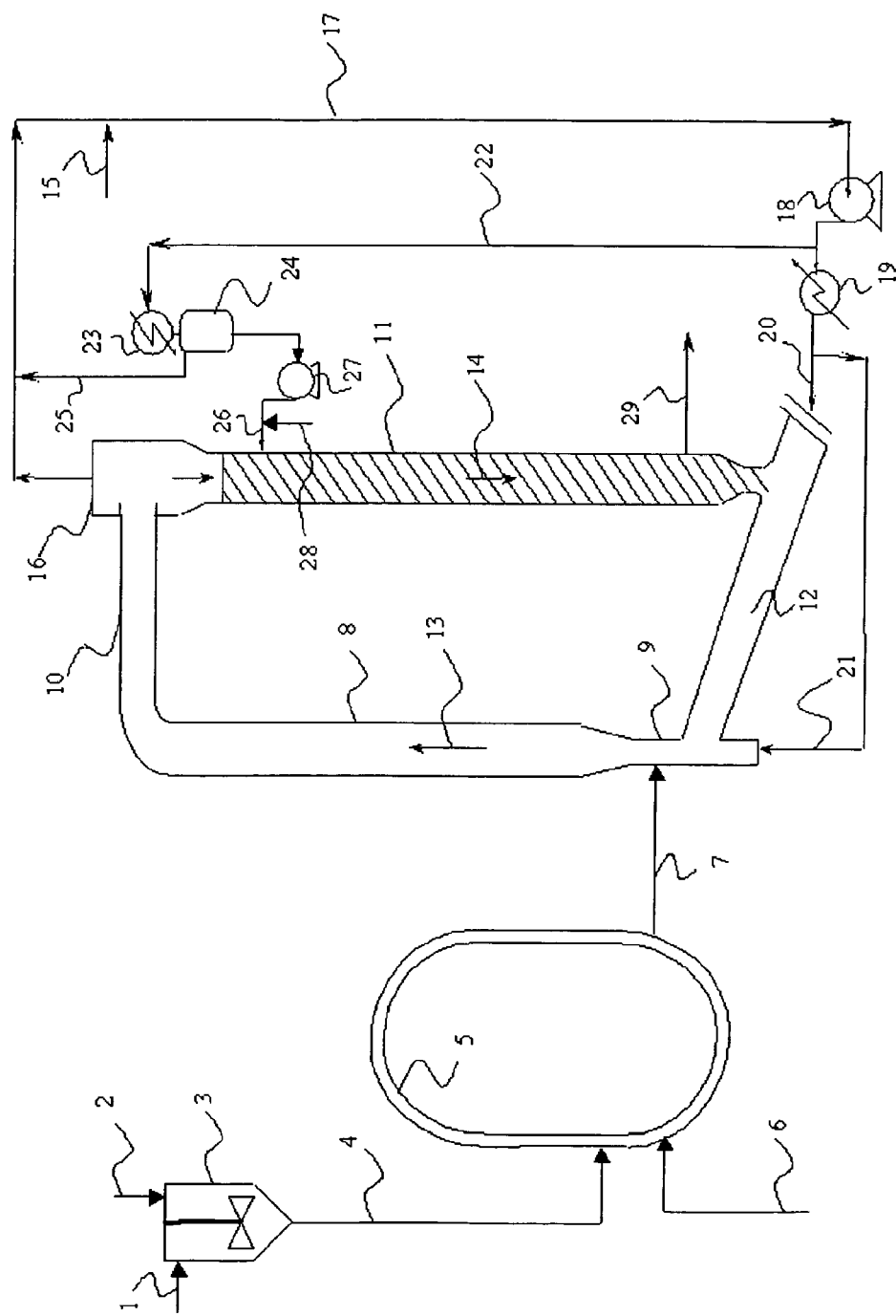
FIG. 1 illustrates a process flow diagram comprising a pre-contacting vessel, where the various catalyst components are premixed, a loop prepolymerization reactor, and a gas-phase polymerization reactor having interconnected polymerization zones.

The polymerization process of the present invention allows achieving an optimal particle size distribution of the obtained polyolefin powders. In fact, the percentage of fine powders is minimized with respect to the case of conventional polymerization into a stirred or fluidized gas-phase reactor. The particle size is generally distributed between 0.2 and 5.0 mm, with most of particles having an average size in the range 1.5-3.0 mm.

Defining as "fines" the polymer particles smaller than 0.3 mm, the total amount of fines formed in the polymerization process of the present invention is generally less than 0.25% by weight. This represents a considerable advantage with respect to the conventional gas-phase or liquid-phase polymerization processes, where the total amount of powders with an average size of less than 0.3 mm is generally around 1.0-3.0%.

According to the process of the invention, the prepolymerization step a) is carried out in a liquid medium in whatever type of reactor. Therefore, continuous stirred tank reactors (CSTR) as well as loop reactors can be used for contacting the olefin monomers with the polymerization catalyst system. However, the prepolymerization treatment is preferably carried out into a liquid loop reactor.

As regards the polymerization catalyst system fed to step a), highly active catalyst systems of the Ziegler-Natta or metallocene type can be used.

A Ziegler-Natta catalyst system comprises the catalysts obtained by the reaction of a transition metal compound of Ti, V, Zr, Cr, and Hf with an organometallic compound of group 1, 2, or 13 of the Periodic Table of element.

A metallocene-based catalyst system comprises at least a transition metal compound containing at least one $\pi$ bond and at least an alumoxane or a compound able to form an alkyl-metallocene cation; optionally an organo-aluminum compound.

The liquid medium of step a) comprises liquid alpha-olefin monomer(s), optionally with the addition of an inert hydrocarbon solvent. Said hydrocarbon solvent can be either aromatic, such as toluene, or aliphatic, such as propane, hexane, heptane, isobutane, cyclohexane and 2,2,4-trimethylpentane. The amount of hydrocarbon solvent, if any, is lower than 40% by weight with respect to the amount of alpha-olefins, preferably lower than 20% by weight. Preferably step a) is carried out in the absence of inert hydrocarbon solvents (bulk polymerization).

The prepolymerization step a) is preferably carried out in the absence of any molecular weight regulator, such as hydrogen. Alternatively, in some cases, a limited amount of hydrogen can be fed to the prepolymerization reactor, on condition that said amount is not higher than 2000 ppm by vol. referred to the total amount of liquid monomer. As a consequence, the prepolymer obtained from step a) is characterized by a high molecular weight distribution: the intrinsic viscosity of said prepolymer generally ranges between 2.0 and 6.0 dl/g.

The average residence time in step a) of the invention is the ratio between the volume of the prepolymerization reactor and the volumetric rate of the polymeric slurry discharged from said reactor. This parameter generally ranges from 2 to 40 minutes and can be modified by an increase or a decrease of the output of the polymeric slurry from the prepolymerizator. Said residence time preferably ranges from 10 to 25 minutes.

As above stated, the operating temperature in step a) generally ranges from 23 to 50° C. and a preferred range is comprised between 27 and 40° C. It has been proven (see the comparative examples) that a prepolymerization temperature of less than 23° C. fails in giving the advantages of the process of the present invention. In fact, if step a) is carried out at a lower temperature, a significant increase of the total amount of fines formed in the successive polymerization step b) is caused.

The polymerization degree of the prepolymerized catalyst system ranges preferably from 60 to 800 g per gram of solid catalyst component, preferably from 150 to 400 g per gram of solid catalyst component. A polymeric slurry containing the prepolymerized catalyst system is discharged from the prepolymerization reactor before to be continuously fed to the polymerization step b).

Step b) is carried out into a gas-phase reactor, as described in the Applicant's earlier EP 782 587 and EP 1 012 195, where the polymerization of one or more olefins is carried out in two interconnected polymerization zones. In the first polymerization zone, hereinafter indicated as the "riser", fast fluidization conditions are imposed: this means that the velocity of the fluidizing gas is higher than the transport velocity of the polymer particles. The terms "transport velocity" and "fast fluidisation state" are well known in the art; for a definition thereof, see, for example, "D. Geldart, Gas Fluidisation Technology, page 155 et seq., J. Wiley & Sons Ltd., 1986".

The riser operates under fast fluidized bed conditions with gas superficial velocities higher than the average particles terminal velocities, so that the polymer particles are entrained upwards by the flow of the reacting monomers. A highly turbulent flow regime is established into the riser: this generates a good heat exchange coefficient between the single particles and the surrounding gas, and also ensures that the reaction temperature is kept reasonably constant along the reaction bed. Generally, the velocity of the fluidizing gas injected into the riser depends on the gas density and the particle size distribution of the solid. This upwardly gas velocity can be generally comprised between 0.5 and 15 m/s, preferably between 0.8 and 5 m/s.

In the second polymerization zone, hereinafter indicated as the "downcomer", the growing polymer particles flow downward in a densified form under the action of gravity. The high density of the solid, which approaches the bulk density of the polymer, is the relevant feature of the second polymerization zone. In this zone a positive gain in pressure can be obtained along the direction of flow, so that it becomes possible to reintroduce the polymer into the riser without the help of special mechanical means. In this way, a "loop" circulation is set up, which is defined by the balance of pressures between the two polymerization zones and by the head losses introduced into the system.

According to the process of the invention, the polymeric slurry containing the prepolymerized catalyst system is continuously fed into the riser at a section thereof having an upwardly gas velocity higher than 3.0 m/s, preferably in the range from 5.0 m/s to 15 m/s.

Gas velocities higher than 3.0 m/s ensure an optimal heat exchange coefficient between the injected prepolymer particles and the surrounding reacting gas, thus significantly reducing the chance of breakage of the prepolymer just introduced into the riser. As above indicated, step a) is preferably carried out at a temperature comprised between 27 and 40° C., while the polymerization in step b) is generally performed at temperatures in the range from 60 to 120° C. Therefore, when fed into the riser, the liquid monomer impregnating the pores of the prepolymer is suddenly introduced into a highly reactive ambient, where it is subjected to a high reactivity with a consequent development of heat generated from the polymerization reaction. This thermal stress could cause the breakage of the prepolymer particles with the consequent formation of particles smaller than 0.3 mm (fines). As shown by the comparative examples, when the prepolymer is fed to a section of riser characterized by a gas velocity lower than 3 m/s, a considerable increase of the amount of fines is caused.

According to a first embodiment of the present invention, the section of the riser is uniform along its height, so that the gas velocity does not substantially change throughout the riser. In this case, the advantages of the invention in term of particle size distribution, i.e. minimization of fine particles, can be achieved by feeding the prepolymerized catalyst system at whatever section along the height of the riser maintaining the gas velocity higher than 3 m/s.

According to a second and preferred embodiment, the section of the riser is not uniform along its height, but it narrows and widens due to the presence of one or more restrictions. In this case the velocity of the upwardly fluidizing gas changes along the height of the riser. The prepolymerized catalyst system can be suitably fed in correspondence of those sections characterized by a gas velocity higher than 3 m/s, while in the remaining sections of the riser the gas velocity can be also maintained at a value lower than 3 m/s. The prepolymeric slurry coming from step a) is preferably fed in correspondence of the bottom part of the riser, where the riser section is designed narrower than the remaining portion of riser.

Moreover, depending on the aimed olefin (co)polymer, the polymerization step b) can be carried out by properly adjusting the polymerization conditions and the monomers concentration in the two polymerization zones, so as to produce a wide variety of bimodal homopolymers and random copolymers. To this purpose, in step b) the gas mixture entraining the polymer particles and coming from the riser can be partially or totally prevented from entering the downcomer, so as to obtain two different gas composition zones. This can be achieved by feeding a gas and/or a liquid mixture into the downcomer through a line placed at a suitable point of the downcomer, preferably in the upper part thereof. Said gas and/or liquid mixture should have a suitable composition, different from that of the gas mixture present in the riser. The flow of said gas and/or liquid mixture may be regulated so that an upward flow of gas counter-current to the flow of the polymer particles is generated, particularly at the top thereof, acting as a barrier to the gas mixture coming from the riser.

The present invention will be now described in detail with reference to FIG. 1, which is illustrative and not limitative of the scope of the present invention.

According to the embodiment shown in FIG. 1 the prepolymerization treatment of the catalyst system (step a) is carried out in a loop reactor, while the polymerization step b) is carried out in a gas-phase reactor having interconnected polymerization zones, the riser having a restriction at the bottom part.

A solid catalyst component 1, a cocatalyst 2 and optionally a donor compound, are fed to a pre-contacting vessel 3 together with a diluent, such as propane. These components are contacted in the vessel 3 at room temperature for a time of 5-60 minutes.

The formed catalyst system is fed via line 4 to a loop prepolymerization reactor 5 to carry out step a) according to the above-stated operating conditions. A α-olefin is fed to the loop reactor 5 via line 6.

A slurry containing the particles of prepolymer is discharged from the loop reactor 5 and is fed via line 7 to the riser 8 of a gas-phase reactor having two interconnected polymerization zones, wherein the polymerization step b) is carried out according to the above-stated operating conditions. In particular, the prepolymerized catalyst system is fed via line 7 to a restricted section 9 of said riser 8, where the fluidizing gas velocity is advantageously maintained at a value higher than 3 m/s.

The gas-phase reactor comprises a riser 8 and a downcomer 11, wherein the polymer particles flow, respectively, upward under fast fluidization condition along the direction of the arrow 13 and downward under the action of gravity along the direction of the arrow 14. The riser 8 and the downcomer 11 are appropriately interconnected by the interconnection bends 10 and 12.

In said gas-phase reactor one or more olefin monomers are polymerized in the presence of hydrogen as the molecular weight regulator. To this aim, a gaseous mixture comprising the monomers, hydrogen and propane, as an inert diluent, is fed to the reactor through one or more lines 15, suitably placed at any point of the recycling system according to the knowledge of those skilled in art.

After flowing through the riser 8, the polymer particles and the gaseous mixture leave the riser 8 and are conveyed to a solid/gas separation zone 16. This solid/gas separation can be effected by using conventional separation means such as, for example, a centrifugal separator (cyclone) of the axial, spiral, helical or tangential type.

From the separation zone 16, the polymer enters the downcomer 11. The gaseous mixture leaving the separation zone 16 is recycled to the riser 8 by means of a recycle line 17, equipped with means for the compression 18 and cooling 19.

After the compression means 18 and the cooling means 19, the recycle gas is divided into two separated streams, the first one is transferred to the connecting section 12 via the line 20 to favor the transfer of the polymer particles from the downcomer 11 to the riser 8. The second stream of recycle gas is fed via line 21 at the bottom of the riser 8 to establish inside the restricted section 9 the fluidization conditions as claimed in the present application.

When polymers with a different composition or polymers with a bimodal molecular weight distribution are wished to be prepared in the polymerization step b), a part of the recycle gas of line 17 is sent via line 22 to a condenser 23, where the gaseous stream is cooled at a temperature involving the partial condensation of the monomers and the inert gases, such as propane. A separating vessel 24 is placed downstream the condenser 23. The gaseous mixture enriched in hydrogen, which collects at the top of the vessel 24 is recycled via line 25 to the recycle line 17. On the contrary, the condensed liquid is fed to the downcomer 11 via line 26. Said liquid can be fed to said downcomer 11 by gravity by placing the vessel 24 at a convenient height or by any other suitable means, such as a pump 27.

The make-up components that are wished to be present in the downcomer 11 can be fed as a liquid via line 28. Line 26 for feeding the liquid barrier is placed in the upper part of the downcomer 11 and allows partially or totally preventing the gas mixture coming from the riser 8 from entering the downcomer 11, so as to obtain two different gas composition zones, as previously explained.

The polymer obtained from the gas-phase reactor of step b) is discharged from the lower part of the downcomer 11 via the discharge line 29.

The gas-phase polymerization process of the invention allows the preparation of a large number of olefin powders having an optimal particle size distribution with a low content of fines. Examples of polymers that can be obtained are:

high-density polyethylenes (HDPEs having relative densities higher than 0.940) including ethylene homopolymers and ethylene copolymers with α-olefins having 3 to 12 carbon atoms;

linear polyethylenes of low density (LLDPEs having relative densities lower than 0.940) and of very low density and ultra low density (VLDPEs and ULDPEs having relative densities lower than 0.920 down to 0.880) consisting of ethylene copolymers with one or more α-olefins having 3 to 12 carbon atoms;

elastomeric terpolymers of ethylene and propylene with minor proportions of diene or elastomeric copolymers of ethylene and propylene with a content of units derived from ethylene of between about 30 and 70% by weight;

isotactic polypropylene and crystalline copolymers of propylene and ethylene and/or other α-olefins having a content of units derived from propylene of more than 85% by weight;

isotactic copolymers of propylene and α-olefins, such as 1-butene, with an α-olefin content of up to 30% by weight;

impact-resistant propylene polymers obtained by sequential polymerisation of propylene and mixtures of propylene with ethylene containing up to 30% by weight of ethylene;

atactic polypropylene and amorphous copolymers of propylene and ethylene and/or other α-olefins containing more than 70% by weight of units derived from propylene;

polybutadiene and other polydiene rubbers.

The above gas-phase polymerisation process can be carried out in the presence of a highly active catalyst system of the Ziegler-Natta or metallocene type.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_nX_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates.

Preferred specific titanium compounds are $TiCl_3$, $TiC_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form.

If a stereospecific polymerization of propylene or higher alpha-olefins is aimed, internal electron donor compounds can be added in the catalyst preparation: such compounds are generally selected from esters, ethers, amines, and ketones. In particular, the use of compounds belonging to 1,3-diethers, phthalates, benzoates and succinates is preferred. Further improvements can be obtained by using, in addition to the internal electron-donor present in the solid component, an electron-donor (external) added to the aluminium alkyl co-catalyst component or to the polymerization reactor. These external electron donor can be the same as, or different from, the internal donor. Preferably they are selected from alkoxysilanes of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

The above cited catalysts show, in addition to a high polymerization activity, also good morphological properties that make them particularly suitable for the use in the gas-phase polymerization process of the invention.

Also metallocene-based catalyst systems can be used in the process of the present invention and they comprise:

at least a transition metal compound containing at least one π bond;

at least an alumoxane or a compound able to form an alkyl-metallocene cation; and optionally an organo-aluminum compound.

A preferred class of metal compound containing at least one π bond are metallocene compounds belonging to the following formula (I):

$$Cp(L)_qAMX_p \quad (I)$$

wherein

M is a transition metal belonging to group 4, 5 or to the lanthanide or actinide groups of the Periodic Table of the Elements; preferably M is zirconium, titanium or hafnium;

the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms; preferably, the substituents X are selected from the group consisting of —Cl, —Br, —Me, —Et, -n-Bu, -sec-Bu, —Ph, —Bz, —CH$_2$SiMe$_3$, —OEt, —OPr, —OBu, —OBz and —NMe$_2$;

p is an integer equal to the oxidation state of the metal M minus 2;

q is 0 or 1; when q is 0 the bridge L is not present;

L is a divalent hydrocarbon moiety containing from 1 to 40 carbon atoms, optionally containing up to 5 silicon atoms, bridging Cp and A, preferably L is a divalent group $(ZR^7_2)_n$; Z being C, Si, and the $R^7$ groups, equal to or different from each other, being hydrogen or a hydrocarbon radical containing from 1 to 40 carbon atoms;

more preferably L is selected from Si(CH$_3$)$_2$, SiPh$_2$, SiPhMe, SiMe(SiMe$_3$), CH$_2$, (CH$_2$)$_2$, (CH$_2$)$_3$ or C(CH$_3$)$_2$;

Cp is a substituted or unsubstituted cyclopentadienyl group, optionally condensed to one or more substituted or unsubstituted, saturated, unsaturated or aromatic rings;

A has the same meaning of Cp or it is a $NR^7$, —O, S, moiety wherein $R^7$ is a hydrocarbon radical containing from 1 to 40 carbon atoms;

Alumoxanes used as component b) are considered to be linear, branched or cyclic compounds containing at least one group of the type:

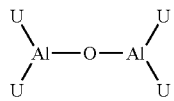

wherein the substituents U, same or different, are defined above.

In particular, alumoxanes of the formula:

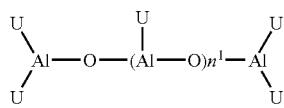

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, or alumoxanes of the formula:

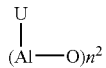

can be used in the case of cyclic compounds, wherein $n^2$ is an integer from 2 to 40 and the U substituents are defined as above.

The following examples will further illustrate the present invention without limiting its scope.

EXAMPLES

General Polymerization Conditions

The polymerization is carried out in continuous in a process setup as shown in FIG. 1 comprising:
  a pre-contacting vessel, where the various catalyst components are premixed;
  a loop prepolymerization reactor;
  a gas-phase polymerization reactor having interconnected polymerization zones.

Step a) of the present invention is carried out in a loop reactor having a volume of 1 m$^3$. The average residence time is the ratio between the reactor volume and the volumetric rate of the polymeric slurry discharged from the loop reactor.

Step b) of the present invention is carried out in a gas-phase polymerization reactor comprising a first polymerization zone (riser) and a second polymerization zone (downcomer). The riser has a height of 35 m and a diameter of 1.8 m, while the downcomer has a height of 20 m and diameter of 1.1 m.

Example 1

A Ziegler-Natta catalyst is used as the polymerization catalyst, comprising:
  a titanium solid catalyst component prepared with the procedure described in EP 728 769, Example 5, lines 46 to 53, according to which diisobutyl phthalate is used as an internal donor compound;
  triethylaluminium (TEAL) as a cocatalyst;
  dicyclopentyldimethoxysilane as an external donor.

0.5 Kg/h of titanium solid catalyst component is fed to the pre-contacting vessel, the weight ratio TEAL/solid component being of 4, the weight ratio TEAL/external donor being of 28. The above catalyst components are pre-contacted at a temperature of 15° C. for 10 minutes.

—Step a)—

The catalyst system withdrawn from the pre-contacting vessel was continuously fed to the prepolymerization loop reactor together with 1600 Kg/h of liquid propylene. The loop reactor is operated in the absence of any molecular weight regulator, at a temperature of 30° C. and a residence time of 20 minutes.

A polypropylene slurry is continuously discharged from the loop reactor. The prepolymeration yield is of about 370 g per gram of solid catalyst component. The obtained polypropylene shows an intrinsic viscosity of about 4.5 dl/g.

—Step b)—

The polypropylene slurry coming from step a) is successively fed, as shown in FIG. 1, to the bottom portion of the riser 8 in correspondence of the restriction 9, where the upwardly velocity of the fluidizing monomer is 6.0 m/s.

Polypropylene is prepared in step b) by polymerizing gaseous propylene in the presence of hydrogen as a molecular weight regulator and propane as an inert diluent. In both the riser 8 and downcomer 11 the following operative conditions are satisfied:

| | |
|---|---|
| Temperature (° C.) | 80 |
| Pressure (barg) | 28 |
| Propylene (% mol) | 90 |
| Propane (% mol) | 9 |
| Hydrogen (% mol) | 1 |

A gaseous stream containing propylene, propane and hydrogen flows upwards along the riser 8, where fast fluidization conditions are established: the upwardly gas velocity is maintained at a value of about 1.9 m/s.

The polypropylene particles coming from the riser are conveyed through the interconnection bend 10 to the separation zone 16. From this zone the polymer is mostly separated from the gas and enters the downcomer 11. The gaseous mixture leaving the separation zone 16 is recycled to the riser 8 by means of a recycle line 17, equipped with means for the compression 18 and cooling 19. The growing polypropylene particles flow downward into the downcomer in "densified" conditions.

The flow rate of polymer particles continuously recirculated through the two polymerization zones is of about 500 ton/h, while about 20 ton/h of polypropylene are continuously discharged from the lower part of the downcomer via the discharge line 29.

The particle size distribution of the obtained polypropylene was measured giving an average diameter of 2.0 mm and a percentage of particles with a diameter smaller than 0.3 mm (fines) equal to 0.1%.

Example 2

Step a)

The same catalyst system of Example 1 was used with the difference that the weight ratio TEAL/external donor was equal to 4.

The catalyst system withdrawn from the pre-contacting vessel was continuously fed to the prepolymerization loop reactor together with 1600 Kg/h of liquid propylene. The loop reactor is operated in the absence of any molecular weight regulator, at a temperature of 27° C. and a residence time of 20 minutes.

A polypropylene slurry is continuously discharged from the loop reactor. The prepolymeration yield is of about 320 g per gram of solid catalyst component. The obtained polypropylene shows an intrinsic viscosity of about 3.8 dl/g.

Step b)

The polypropylene slurry coming from step a) is successively fed, as shown in FIG. 1, to the bottom portion of the riser 8 in correspondence of the restriction 9, where the upwardly velocity of the fluidizing monomer is 6.5 m/s.

A propylene/ethylene copolymer is prepared in step b) by copolymerizing propylene and ethylene in the presence of hydrogen as a molecular weight regulator and propane as an inert diluent. In both the riser and downcomer the following operative conditions are satisfied:

| | |
|---|---|
| Temperature (° C.) | 75 |
| Pressure (barg) | 29 |
| Propylene (% mol) | 88.5 |
| Ethylene (% mol) | 2.5 |
| Propane (% mol) | 8.0 |
| Hydrogen (% mol) | 1.0 |

A gaseous stream containing propylene, ethylene, propane and hydrogen flows upwards along the riser 8, where fast fluidization conditions are established: the upwardly gas velocity is maintained at a value of about 2.0 m/s The copolymer particles coming from the riser are conveyed through the interconnection bend 10 to the separation zone 16. From this zone the copolymer is mostly separated from the gas and enters the downcomer 11. The growing polypropylene particles flow downward into the downcomer in "densified" conditions.

The flow rate of polymer particles continuously recirculated through the two polymerization zones is of about 650 ton/h, while about 20 ton/h of propylene/ethylene copolymer are continuously discharged from the lower part of the downcomer via the discharge line 29.

The particle size distribution of the obtained propylene/ethylene copolymer was measured giving an average diameter of 1.9 mm and a percentage of particles with a diameter smaller than 0.3 mm (fines) equal to 0.15%.

Example 3

A Ziegler-Natta catalyst is used as the polymerization catalyst, comprising:
- a titanium solid catalyst component prepared with the procedure described in EP 728 769, Example 1, according to which 9,9-bis(methoxymethyl)fluorene is used as an internal donor compound;
- Triethylaluminium (TEAL) as a cocatalyst;
- Cyclohexylmethyldimethoxysilane as an external donor.

0.4 Kg/h of titanium solid catalyst component is fed to the pre-contacting vessel, the weight ratio TEAL/solid component being of 4, the weight ratio TEAL/external donor being of 20. The above catalyst components are pre-contacted at a temperature of 15° C. for 10 minutes.

—Step a)—

The catalyst system withdrawn from the pre-contacting vessel was continuously fed to the prepolymerization loop reactor together with 1600 Kg/h of liquid propylene. The loop reactor is operated in the absence of any molecular weight regulator, at a temperature of 35° C. and a residence time of 20 minutes.

A polypropylene slurry is continuously discharged from the loop reactor. The prepolymeration yield is of about 400 g per gram of solid catalyst component. The obtained polypropylene shows an intrinsic viscosity of about 3.7 dl/g.

—Step b)—

The polypropylene slurry coming from step a) is successively fed to the bottom portion of the riser 8 in correspondence of the restriction 9, where the upwardly velocity of the fluidizing monomer is 5.5 m/s.

Polypropylene is prepared in step b) by polymerizing gaseous propylene in the presence of hydrogen as a molecular weight regulator and propane as an inert diluent. In both the riser and downcomer the following operative conditions are satisfied:

| | |
|---|---|
| Temperature (° C.) | 80 |
| Pressure (barg) | 28 |
| Propylene (% mol) | 90 |
| Propane (% mol) | 9 |
| Hydrogen (% mol) | 1 |

A gaseous stream containing propylene, propane and hydrogen flows upwards along the riser, where fast fluidization conditions are established: the upwardly gas velocity is maintained at a value of about 1.8 m/sec.

The polypropylene particles coming from the riser are conveyed through the interconnection bend 10 to the separation zone 16. From this zone the polymer is mostly separated from the gas and enters the downcomer. The growing polypropylene particles flow downward into the downcomer in "densified" conditions.

The flow rate of polymer particles continuously recirculated through the two polymerization zones is of about 600 ton/h, while about 20 ton/h of polypropylene are continuously discharged from the lower part of the downcomer via the discharge line 29.

The particle size distribution of the obtained polypropylene was measured giving an average diameter of 1.5 mm and a percentage of particles with a diameter smaller than 0.3 mm (fines) equal to 0.18%.

Example 4

A Ziegler-Natta catalyst is used as the polymerization catalyst, comprising:
- a titanium solid catalyst component prepared with the procedure described in WO 00/63261, Example 10, according to which diethyl 2,3-diisopropyl-succinate is used as an internal donor compound;
- triethylaluminium (TEAL) as a cocatalyst;
- dicyclopentyldimethoxysilane as an external donor.

0.7 Kg/h of titanium solid catalyst component is fed to the pre-contacting vessel, the weight ratio TEAL/solid component being of 5, the weight ratio TEAL/external donor being of 6. The above catalyst components are pre-contacted at a temperature of 15° C. for 10 minutes.

—Step a)—

The catalyst system withdrawn from the pre-contacting vessel was continuously fed to the prepolymerization loop reactor together with 2200 Kg/h of liquid propylene. The loop reactor is operated in the absence of any molecular weight regulator, at a temperature of 28° C. and a residence time of 13 minutes.

A polypropylene slurry is continuously discharged from the loop reactor. The prepolymeration yield is of about 300 g per gram of solid catalyst component. The obtained polypropylene shows an intrinsic viscosity of about 5.5 dl/g.

—Step b)—

The polypropylene slurry coming from step a) is successively fed, as shown in FIG. 1, to the bottom portion of the riser 8 in correspondence of the restriction 9, where the upwardly velocity of the fluidizing monomer is 6.0 m/s.

Polypropylene is prepared in step b) by polymerizing gaseous propylene in the presence of hydrogen as a molecular weight regulator and propane as an inert diluent. In both the riser 8 and downcomer 11 the following operative conditions are satisfied:

| | |
|---|---|
| Temperature (° C.) | 75 |
| Pressure (barg) | 28 |
| Propylene (% mol) | 77 |
| Propane (% mol) | 20 |
| Hydrogen (% mol) | 3 |

A gaseous stream containing propylene, propane and hydrogen flows upwards along the riser 8, where fast fluidization conditions are established: the upwardly gas velocity is maintained at a value of about 1.9 m/s.

The polypropylene particles coming from the riser are conveyed through the interconnection bend 10 to the separation zone 16. From this zone the polymer is mostly separated from the gas and enters the downcomer 11. The gaseous mixture leaving the separation zone 16 is recycled to the riser 8 by means of a recycle line 17, equipped with means for the compression 18 and cooling 19. The growing polypropylene particles flow downward into the downcomer in "densified" conditions.

The flow rate of polymer particles continuously recirculated through the two polymerization zones is of about 530 ton/h, while about 20 ton/h of polypropylene are continuously discharged from the lower part of the downcomer via the discharge line 29.

The particle size distribution of the obtained polypropylene was measured giving an average diameter of 1.9 mm and a percentage of particles with a diameter smaller than 0.3 mm (fines) equal to 0.13%.

Example 5 (Comparative)

Step a)

The same catalyst system used in Example 1 is continuously fed to the loop prepolymerization reactor together with 1600 Kg/h of liquid propylene.

The loop reactor is operated in the absence of any molecular weight regulator, at a temperature of 15° C. and a residence time of 20 minutes.

A polypropylene slurry is continuously discharged from the loop reactor. The prepolymeration yield is of about 170 g per gram of solid catalyst component. The obtained polypropylene shows an intrinsic viscosity of about 4.2 dl/g.

Step b)

The polypropylene slurry coming from step a) is successively fed, as shown in FIG. 1, to the bottom portion of the riser 8 in correspondence of the restriction 9, where the upwardly velocity of the fluidizing monomer is adjusted at 6.0 m/s.

Polypropylene is prepared in step b) by polymerizing gaseous propylene in the presence of hydrogen as a molecular weight regulator and propane as an inert diluent. In both the riser and downcomer the same operative conditions of Example 1 were established. The growing polypropylene particles flow downward into the downcomer in "densified" conditions.

The flow rate of polymer particles continuously recirculated through the two polymerization zones is of about 500 ton/h, while about 20 ton/h of polypropylene are continuously discharged from the lower part of the downcomer via the discharge line 29.

The particle size distribution of the obtained polypropylene was measured giving an average diameter of 2.0 mm and a percentage of particles with a diameter smaller than 0.3 mm (fines) equal to 1.2%.

Example 6 (Comparative)

Step a)

The same catalyst system used in Example 1 is continuously fed to the loop prepolymerization reactor together with 1600 Kg/h of liquid propylene.

The loop reactor is operated in the absence of any molecular weight regulator, at a temperature of 30° C. and a residence time of 20 minutes.

A polypropylene slurry is continuously discharged from the loop reactor. The prepolymeration yield is of about 370 g per gram of solid catalyst component. The obtained polypropylene shows an intrinsic viscosity of about 4.5 dl/g.

Step b)

The polypropylene slurry coming from step a) is successively fed to the bottom portion of the riser 8 in correspondence of the restriction 9, where the upwardly velocity of the fluidizing monomer is 2.0 m/s.

Polypropylene is prepared in step b) by polymerizing gaseous propylene in the presence of hydrogen as a molecular weight regulator and propane as an inert diluent. In both the riser and downcomer the same operative conditions of Example 1 were established. The growing polypropylene particles flow downward into the downcomer in "densified" conditions.

The flow rate of polymer particles continuously recirculated through the two polymerization zones is of about 350 ton/h, while about 20 ton/h of polypropylene are continuously discharged from the lower part of the downcomer via the discharge line 29.

The particle size distribution of the obtained propylene/ethylene copolymer was measured giving an average diameter of 2.0 mm and a percentage of particles with a diameter smaller than 0.3 mm (fines) equal to 1.4%.

The enclosed Table 1 sums up the main operative conditions adopted in Examples 1-6 and points out the results in term of particle size distribution of the obtained polymer.

As demonstrated by the data of the comparative Examples 5 and 6, when opting out of the operative conditions claimed for step a) and b), the fines are produced in a considerably higher amount (about one order of magnitude).

TABLE 1

| | Step a) Temp (° C.) | Step a) Resid. time (min) | Feeding of step b) Gas velocity (m/s) | % fines |
|---|---|---|---|---|
| Example 1 | 30 | 20 | 6.0 | 0.1 |
| Example 2 | 27 | 20 | 6.5 | 0.15 |
| Example 3 | 35 | 20 | 5.5 | 0.18 |
| Example 4 | 28 | 13 | 6.0 | 0.13 |
| Example 5 (Comp.) | 15 | 20 | 6.0 | 1.2 |
| Example 6 (Comp.) | 30 | 20 | 2.0 | 1.4 |

The invention claimed is:

1. A process for the gas-phase polymerization of at least one alpha-olefin in the presence of a catalyst system, the process comprising:

a) contacting in a continuous way at least one of said alpha-olefins with said catalyst system in a prepolymerization reactor, wherein a reaction comprising an average residence time is carried out in a liquid medium at a temperature ranging from 23° to 50° C., thereby forming a prepolymer;

b) feeding in continuously the prepolymer into a gas-phase reactor having interconnected polymerization zones, where the growing polymer particles flow upward through a first polymerization zone (riser) comprising a gas mixture, a bottom portion, and an upper part, under fast fluidization or transport conditions, leave said riser and enter a second polymerization zone (downcomer) comprising an upper part through which they flow downward under the action of gravity, leave said downcomer and are reintroduced into the riser, thus establishing a circulation of polymer between the riser and the downcomer, wherein the prepolymer is continuously fed at a section of said riser comprising an upwardly gas velocity higher than 3.0 m/s.

2. The process according to claim 1, wherein the prepolymerization step a) is carried out in a liquid medium in a continuous stirred tank reactor (CSTR) or in a loop reactor.

3. The process according to claim 1, wherein said catalyst system fed to step a) is a Ziegler-Natta or metallocene catalyst system.

4. The process according to claim 2, wherein said liquid medium comprises liquid alpha-olefin monomer(s), optionally together with an amount of an inert hydrocarbon solvent.

5. The process according to claim 4, wherein the amount of said hydrocarbon solvent is lower than 40% by weight with respect to the amount of said liquid alpha-olefins.

6. The process according to claim 1, wherein step a) is carried out in the absence of any molecular weight regulator.

7. The process according to claim 4, wherein step a) is carried out in a presence of hydrogen in an amount lower than 2000 ppm by vol. referred to a total amount of liquid monomers.

8. The process according to claim 1, wherein the prepolymer comprises an intrinsic viscosity ranging from 2.0 to 6.0 dl/g.

9. The process according to claim 1, wherein the average residence time in step a) ranges from 2 to 40 minutes.

10. The process according to claim 1, wherein the temperature in step a) ranges from 27 to 40° C.

11. The process according to claim 1, wherein the upwardly gas velocity is in the range from 5.0 m/s to 15 m/s.

12. The process according to claim 1, wherein the polymerization step b) is carried out at a temperature in the range from 60 to 120° C.

13. The process according to claim 1, wherein the prepolymer is fed to the bottom portion of the riser, said bottom portion comprising a section narrower than the remaining portion of said riser.

14. The process according to claim 1, wherein in step b) at least one of a gas and a liquid mixture having a composition different from that of the gas mixture present in the riser is fed into the downcomer via a line located at the upper part thereof.

* * * * *